(12) United States Patent
Heinrich

(10) Patent No.: US 6,374,374 B1
(45) Date of Patent: Apr. 16, 2002

(54) ERROR PROCESSING CIRCUIT FOR A RECEIVING LOCATION OF A DATA TRANSMISSION SYSTEM

(75) Inventor: Peter Heinrich, Rosenheim (DE)

(73) Assignee: STMicroelectronics GmbH, Grasbrunn (DE)

( * ) Notice: Subject to any disclaimer, the term of this patent is extended or adjusted under 35 U.S.C. 154(b) by 0 days.

(21) Appl. No.: 09/330,475

(22) Filed: Jun. 11, 1999

(30) Foreign Application Priority Data

Jun. 12, 1998 (DE) .......................................... 198 26 388

(51) Int. Cl.[7] ........................ H03M 13/00; G01R 31/28; G06F 7/02
(52) U.S. Cl. ........................ 714/709; 714/712; 714/820
(58) Field of Search .................................. 714/752, 709, 714/712, 714, 715, 819, 820, 821, 56, 43; 370/242, 244, 247

(56) References Cited

U.S. PATENT DOCUMENTS 3,934,224 A * 1/1976 Dulaney et al. ............. 714/750
5,430,747 A * 7/1995 Jibbe et al. .................. 714/811
5,838,899 A * 11/1998 Leavitt et al. ................. 714/56

FOREIGN PATENT DOCUMENTS

DE       195 23 031        12/1996
EP       0 643 515         3/1995

* cited by examiner

*Primary Examiner*—Christine T. Tu
(74) *Attorney, Agent, or Firm*—Lisa Jorgenson; E. Russell Tarleton; Seed IP Law Group PLLC

(57) ABSTRACT

An error processing circuit for a receiving location of a system for transferring binary data in the form of pulse sequences, wherein the system has a number of receiving locations connected via a double-line bus having a first line and a second line. The circuit includes a data output, a decoder having three decoder outputs, of which a first decoder output associated with both lines delivers a first decoder output signal dependent on the difference between the potential values of both lines, a second decoder output associated with the first line delivers a second decoder output signal dependent on the difference between the potential value of the first line and a first mean potential value, and a third decoder output associated with the second line delivers a third decoder output signal dependent on the difference between the potential value of the second line and a second mean potential value. A line condition detector circuit detects error-free line conditions, line errors of the first line, and line errors of the second line, depending on the decoder output signals, and changeover control signals can be delivered to a changeover switch to deliver properly decoded data, depending on the particular detection result.

20 Claims, 3 Drawing Sheets

| Line condition | | Output of | | |
|---|---|---|---|---|
| | | CA | CB | CD |
| I | r | 1 | 1 | 1 |
| I | d | 0 | 0 | 0 |
| II | r | 1 | 1 | 1 |
| II | d | 1 | 0 | 0 |
| III | r | 0 | 1 | 0 |
| III | d | 0 | 0 | 0 |
| IV | r | 1 | 0 | 0 |
| IV | d | 0 | 0 | 0 |
| V | r | 1 | 1 | 1 |
| V | d | 0 | 1 | 0 |
| VI | r | 0 | 0 | 0 |
| VI | d | 0 | 0 | 0 |

*Fig. 4*

ERROR PROCESSING CIRCUIT FOR A RECEIVING LOCATION OF A DATA TRANSMISSION SYSTEM

TECHNICAL FIELD

The invention relates to an error processing circuit for a receiving location of a system for transferring binary data in the form of pulse sequences.

BACKGROUND OF THE INVENTION

One form of a data transmission system is a CAN system. The term CAN stands for Controller Area Network. Further details in this respect can be found in the book "Controller Area Network: CAN" by Konrad Etschberger, Carl Hanser Publishing House 1994, ISBN No. 3-446-17596-2. Of interest in the present context are the sections on Protocol Properties on pages 25 and 26 and Data/Frame Format on pages 37 to 43.

Such CAN systems are employed for example in the field of motor vehicles.

There is a common supply voltage source for the CAN system, e.g., in the form of a motor vehicle battery delivering for instance a battery voltage of 12 V. Furthermore, each network node has an individual operating voltage source associated with each network node, which produces from the supply voltage a regulated operating voltage feeding the respective network node. Each operating voltage source delivers an operating potential, for example of 5 V, at a first terminal and a reference potential, for example ground potential or 0 V, at a second terminal.

The transmitting part of a network node has two resistors and two controllable electronic switches connected to the two lines of the double-line bus. One of these lines is connected via a first one of these resistors to the operating potential (5 V) and via a first one of these switches to the reference potential (0 V). The other line is connected via the second resistor to the reference potential (0 V) and via the second switch to the operating potential (5 V). For transmitting digital communications, the two switches are controlled synchronously either to a conducting state or to a non-conducting state. When the switches are controlled to the non-conducting state, the operating potential is present on one line and the reference potential is present on the other line. This switch state, for example, has the logic value "1" associated therewith. When the switches are controlled to the conducting state, the reference potential is present on one line and the operating potential is present on the other line. This switch state then has the logic value "0" associated therewith.

As the transmitting parts of all network nodes capable of transmission are connected in parallel with respect to the two lines, the potential ratio on the two lines, which is associated with logic value "0", can be produced by closing the two switches of each of the transmissive network nodes. On the other hand, the non-conducting state of the two switches of each network node can be covered up by the conducting state of the two switches of another network node. For this reason, the logic value associated with a closed switch pair (logic value "0") is referred to as dominant and the logic value associated with a non-conducting switch pair (logic value "1") is referred to as recessive.

The receiving part of each network node capable of reception comprises a comparator comparing the respective potentials on the two lines with each other. Upon reception of a recessive bit (logic value "1"), for example, a positive potential is created at the output of the comparator, which has the logic value "1" associated therewith. Upon reception of a dominant bit (logic value "0"), a potential corresponding to the reference potential is present at the output of the comparator, which then has the logic value "0" associated therewith. The comparator thus constitutes a decoder for the potential relationships corresponding to the respective transmitted bit on both lines.

For reasons of redundance, the two lines are used in addition to system ground. The message information corresponding to the potential value of the respective bit transmitted is thus transferred both via the one line and via the other line. In case of failure of one of the lines, the further transmission operation can be restricted to the non-failed line. For detecting line failures, two additional comparators are provided, one thereof comparing the potential of one line and the other one thereof the potential of the other line with a mean potential that is between the operating potential and the reference potential.

There can occur different line failures or line faults or errors, for instance, in the form of short-circuits between the two lines, short-circuits towards system ground, short-circuits towards the operating potential source, short-circuits towards the supply voltage source or in the form of open lines. There are line errors that do not hinder secure decoding of the communications transmitted. There are other line errors against which specific measures need to be taken in order to still render possible correct decoding. More details in this respect can be found in DE 195 23 031 A1.

In a CAN network, the messages or communications are transferred in the form of pulse sequences or frames spaced apart in time. The usual CAN protocol provides that a minimum distance in time is present between the individual frames and that within one frame there must be no more than 11 recessive or dominant bits in succession.

It is known from DE 196 23 031 A to use, for a decoder on the receiving side, the three comparators mentioned hereinbefore, to examine the output signals thereof for the presence of specific line errors with the aid of an error recognition circuit and to decide, depending on the result of this comparison, the output of which one of these three comparators is to be connected to a data output of the receiving location via a multiplexer controlled by the error recognition circuit. When the comparator comparing the potential values of the two lines delivers the potential value of the dominant logic value "0" for a longer duration than permitted according to the CAN protocol, it is assumed that the two lines are either short-circuited with respect to each other or the first line has a short-circuit towards system ground, and the comparator used as data output is that one which compares the potential of the second line to a mean potential value. This means, as soon as the comparator comparing the potential values permanently has the dominant logic value "0" beyond the duration permitted by the CAN protocol, recourse is taken to the potential changes on the second line for decoding of the data received.

However, there are line faults or errors that are recognizable by a permanent dominant logic value "0" at the output of the comparator comparing the potential values of the two lines, but in case of which there are no more potential changes taking place on the second line. Such a case is present when the second line displays a short-circuit towards the operating voltage source (5 V) associated with or inherent with each network node. In case of such a line error too, the known circuit arrangement also takes recourse to the output of the comparator monitoring the second line with respect to potential changes. And as there are no more potential changes taking place, data decoding fails.

SUMMARY OF THE INVENTION

The invention provides an error processing circuit for a receiving location of a system for transferring binary data in the form of pulse sequences, wherein the system has a number of receiving locations connected via a double-line bus having a first line and a second line. A first logic value of the binary data is represented by a high potential value on the first line and a low potential value on the second line, and a second logic value of the binary data is represented by a low potential value on the first line and a high potential value on the second line. Within each pulse sequence, there must be no more than a predetermined number of equal data bits in succession.

The receiving location includes a data output, a decoder having three decoder outputs, a first decoder output associated with both lines delivers a first decoder output signal dependent on the difference between the potential values of both lines, a second decoder output associated with the first line delivers a second decoder output signal dependent on the difference between the potential value of the first line and a first mean potential value, and a third decoder output associated with the second line delivers a third decoder output signal dependent on the difference between the potential value of the second line and a second mean potential value, the first mean potential value and the second mean potential value each lying between the high potential value and the low potential value. In the error-free case and upon occurrence of line errors of a first error group with a line error on one of the two lines, at least the first decoder output delivers properly decoded data, and upon occurrence of a second error group with a line error on one of the two lines, only the decoder output associated with the error-free other line still delivers properly decoded data.

The circuit further includes a line condition detector circuit, by means of which error-free line conditions as well as line errors of the first line and line errors of the second line can be detected depending on the decoder output signals, and changeover control signals can be delivered depending on the particular detection result; and a controllable changeover switch by means of which the data output, upon detection of line conditions in which only the second or third decoder output delivers properly decoded data, is connected to this decoder output and otherwise to the first decoder output.

The error processing circuit not only detects whether the decoder, in connection with the comparison of the potential values of the two lines, permanently delivers the dominant logic value "0" and in this case switches over to evaluation of the potential values of the second line only, but the error consideration and error processing always take into consideration the line conditions of both lines with respect to still existing potential changes. This provides the possibility that in case of any line error in which a comparison of the potential values of the two lines no longer allows data decoding, recourse can be taken to switch to one of the two lines that still exhibits potential changes.

With the line error mentioned, in which the second line is short-circuited with the operating voltage of the network node considered and in which the known error processing circuit no longer permits data decoding since it switches over just to this error-inflicted line in case of data decoding, the invention provides for data decoding switching over to the first line that still has potential changes.

The line condition detector circuit may comprise: a first logic circuit linking the first decoder output signal and the second decoder output signal and delivering a first logic signal; a second logic circuit linking the first decoder output signal and the third decoder output signal and delivering a second logic signal; a first time measuring circuit measuring the first logic signal and a second time measuring circuit measuring the second logic signal, by means of which a time measurement of logic signal values of the first and second logic signals, respectively, which may mean a line error, is carried out and a first and second line error signal, respectively, is generated when such a logic signal value, as of occurrence thereof, has a longer duration than a duration corresponding to the predetermined number of equal data bits; and a third logic circuit linking the two line error signals, said third logic circuit linking the two line error signals so as to provide the changeover control signal.

The two time measuring circuits provide the possibility of time masking potential value conditions on the two lines that would be interpreted as line errors although they may occur within the protocol of the data transmission system with error-free line, until it is established according to the protocol that these really must be line errors.

The first, second, and third logic circuits may each be composed of a NOR element, and the fourth logic circuit may be an AND element having an inverting input and a non-inverting input. The two time measuring circuits may each be constituted by a counter which counts clock pulses fed thereto via a counting clock input, as long as it is released to count via a counting release/resetting input. A first logic value, for example "1", releases the counter for counting, and a second logic value, in the present example "0", resets the counter to an initial counting state, preferably to a count of 0. Potential value patterns on the two lines, which may occur in case of line errors, release counting of the one and/or the other counter and, in case they last longer than the period of time permitted by the protocol of the data transmission system, result in a potential change at the output of the respective counter, which is evaluated by the third logic circuit having the third NOR element and the AND element.

The decoder, in a maimer known per se, may be composed of three comparators, of which a first one compares the potential values of the two lines with each other and the two other ones compare the potential value of the first line and the second line, respectively, with a mean potential value lying between the high potential value and the low potential value which are transmitted via the two lines in case of error-free lines.

The controllable changeover switch may be composed of a multiplexer having three inputs, each one thereof being connected to one of the three comparator outputs, and having a multiplexer output connected to the data output of the receiving location, as well as three changeover control inputs. Of the latter ones, one is connected to the counter output of the first counter, a second one is connected to the output of the third NOR element, and a third one is connected to the output of the AND element.

The multiplexer and the third logic circuit of the line condition detector circuit are composed and connected in such a manner that the multiplexer output connected to the data output of the receiving location is connected to the output of the first comparator comparing the potential values of both lines with each other, always at such times when both lines are error-free or when such line errors are present with which the comparator output of the first comparator still delivers potential changes from which the data transmitted can be derived. Construction and connection of multiplexer and third logic circuit furthermore are selected such that, in case of line errors with which there are no longer potential changes occurring at the output of the first comparator and thus no more logic values changes take place, the data output of the receiving location is connected to the comparator output of the second or third comparator, depending on whether there still are potential changes and thus logic value changes occurring with the line error involved at the comparator output of the second or third comparator.

BRIEF DESCRIPTION OF THE DRAWINGS

Further features and advantages of the invention will be described in more detail below with reference to the attached drawings in which:

FIG. 4 shows a table for elucidating the mode of operation.

DETAILED DESCRIPTION OF THE INVENTION

Figure 1:
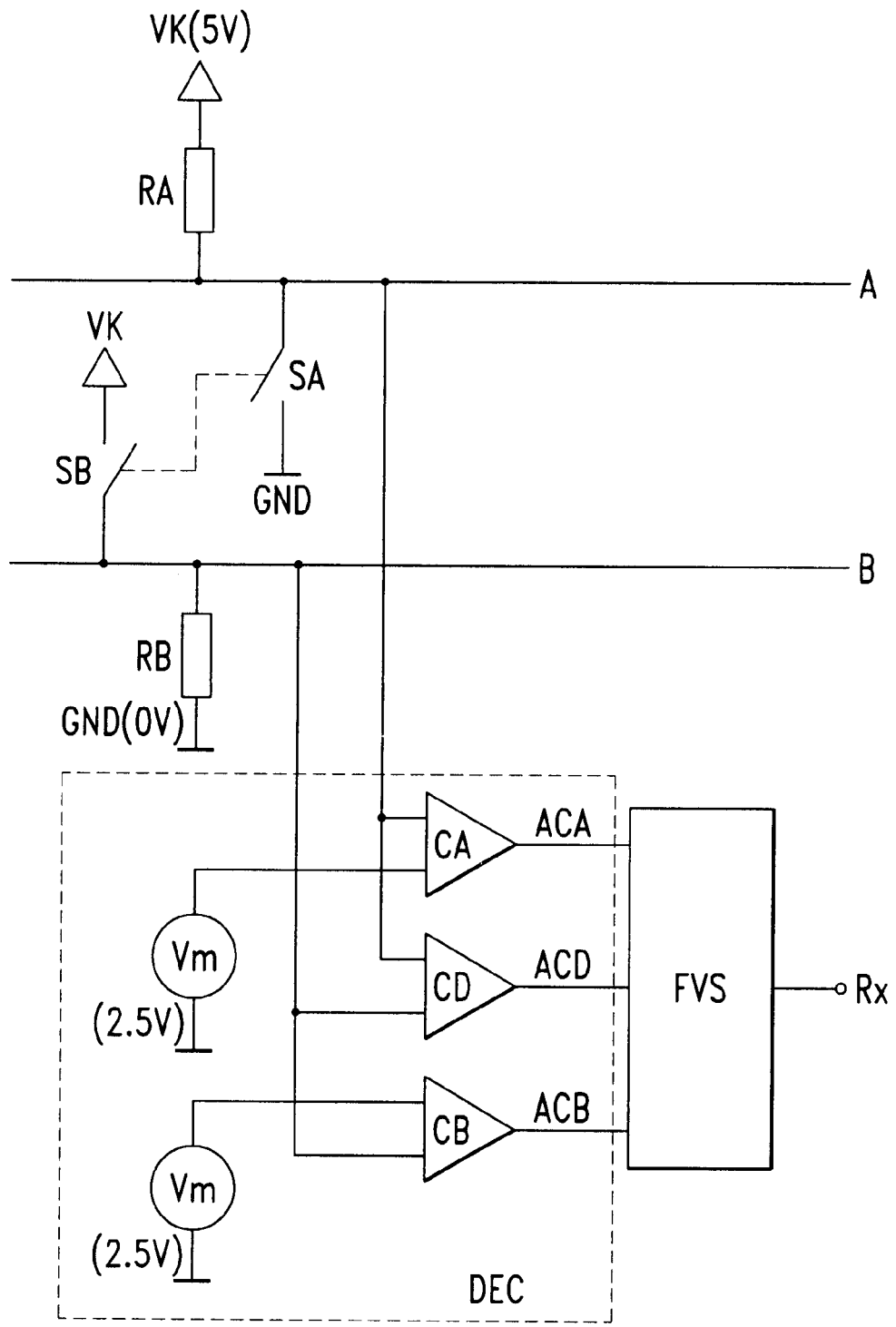
FIG. 1 shows an embodiment of a receiving location of a data processing system having a decoder and an error processing circuit in accordance with the invention as well as a controllable changeover switch.

The embodiment shown in FIG. 1 comprises a double-line bus having two lines A and B of a CAN system. This system comprises a plurality of network nodes. FIG. 1 shows circuit components of only one single network node. The further network nodes are composed at least in part in identical manner.

Each network node is capable of transmitting and receiving and constitutes a transmitting location and a receiving location.

The first line A is connected via a first resistor RA to a network-node-inherent operating potential source VK (for example 5 V), whereas the second line is connected via a second resistor RB to a reference potential source GND (for example 0 V). Furthermore, the first line A is connected via a first switch SA to the reference potential source GND and the second line B is connected via a second switch SB to the reference potential source VK. The two switches are simultaneously controlled either to a conducting state or to a non-conducting state by a transmission signal source (not shown). In the non-conducting state of the two switches SA and SB, the reference potential VK, for example 5 V, is present on line A and the reference potential, for example 0 V, is present on line B.

Associated with these switch and potential states are the term "recessive" and the logic value "1"s. When switches SA and SB are switched to the conducting state, first line A is at reference potential (0 V) and second line B is at operating potential (5 V). These switch and potential states have the term "dominant" and the logic value "0" associated therewith. In case of a logic value change of the binary communication signal transmitted via the double-line bus, a potential change thus takes place on both lines from 5 V to 0 V and from 0 V to 5 V, respectively. Due to the synchronous control of both switches SA and SB, communication pulses are transmitted on the two lines A and B in synchronous manner in terms of time slot, but in opposite manner in terms of amplitude.

The potentials on both lines A and B are determined by the switching states of both switches SA and SB of all network nodes involved. The non-conducting switch state of both switches SA and SB of one or several network nodes can be overridden by the conducting switch position of both switches SA and SB of one or several other network nodes. For this reason, the non-conducting state of both switches SA and SB of a network node is referred to as recessive and the conducting switching state thereof is referred to as dominant.

The receiving part of the respective network node comprises a decoder DEC having three comparators CA, CB and CD.

A first comparator CD is used to establish the difference between the potential on line A and the potential on line B. When line A has a higher potential than line B, logic value "1" appears at the output of comparator CD, otherwise the logic value "0" appears. A recessive state or logic value "1" on the double-line bus thus has a logic value "1" associated therewith at the output of the comparator CD, whereas in the case of a dominant state or logic value "0" on the double-line bus, a logic value "0" appears at the output of comparator CD. Comparator CD thus serves as a decoder for the communications transmitted in the form of the potentials described via the double-line bus.

A second comparator CA compares the respective potential of line A to a mean potential of, for example, 2.5 V lying between the high potential value of 5 V and the low potential value of 0 V. A third comparator CB compares the potential of line B with a mean potential which, for example, is also about 2.5 V.

When potential changes are taking place on line A, these result in corresponding logic value changes between "1" and "0" at the output of comparator CA. When the potential of line A due to a line error or fault remains permanently on a high potential value (5 V), a logic value "1" permanently appears at the output of comparator CA. When the potential value of line A permanently remains on a low potential value of 0 V due to a line error, a logic value "0" permanently appears at the output of comparator CA.

Changes between logic values "1" and "0" appear at the output of comparator CB when both lines are error-free, whereas in case of a line error concerning line B, a logic value "0" or "1" permanently appears depending on whether the potential on line B permanently remains on a high potential value of 5 V or a low potential value of 0 V, respectively.

Each network node has an operating voltage source of its own, which is obtained as regulated voltage from the supply voltage source common to the entire data transmission system, for example a motor vehicle battery. The supply voltage source has a system ground associated therewith, which in the case of a motor vehicle is in the form of metal material in the car frame and body. The reference potential GND of the network-node-associated operating voltage source usually is equal to system ground potential, namely 0 V. When looking at an on-board car CAN network, the two lines A and B of the double-line bus usually are routed along car body parts. It may happen then that a short-circuit of line A and/or line B arises towards system ground, for example as a result of fraying of the insulation of the line concerned.

However, there may also be line errors in the form of short-circuits towards the operating potential.

According to the protocol already mentioned, which holds for example for CAN networks, communications transmitted are transferred in the form of pulse sequences or data frames that have a prescribed minimum distance in time from each other and within which there must be no more than a prescribed number of successive bits, namely 11 successive bits having the same logic value.

When disregarding line errors in which a line short-circuit towards the supply voltage of the total system is present, i.e., towards battery voltage in case of a CAN system for a motor vehicle, the following line conditions are possible:

I: Error-free line condition

II: Short-circuit of line A towards network-node-inherent operating voltage (5 V) (stuck-at-one)

III: Short-circuit of line A towards ground (0 V) (stuck-at-zero)

IV: Short-circuit of line B towards network-node-inherent operating voltage (5 V) (stuck-at-one)

V: Short-circuit of line B towards ground (0 V) (stuck-at-zero)

VI: Short-circuit of lines A and B with each other (bridging fault)

In these six different line conditions, logic value patterns as shown in FIG. 4 result for recessive bits with logic value "1" and for dominant bits with logic value "0" at the outputs of the three comparators CA, CB and CD, from which can be seen the following conditions.

In the error-free line condition, each one of the three comparators CA, CB and CD delivers at its output potential changes between "1" and "0" during a change between recessive (abbreviated "r" in the table) and dominant (abbreviated "d" in the table) on the two lines. In the case of error conditions II and V, the comparator outputs of comparator CD as well as comparator CB and comparator CA, respectively, deliver logic value changes during changes between "r" and "d". Upon occurrence of errors III and IV, only the output of comparator CB and comparator CA, respectively, delivers a logic value change during changes between "r" and "d", whereas comparators CD and CA and, respectively, CD and CB no longer display logic value changes. In the case of line error VI, a logic value change does not occur at the output of any of the three comparators with a change between "r" and "d".

These logic values changes in the table of FIG. 4 mean the following:

In error-free line condition I and line errors II and V, comparator CD can be used for decoding the data bits received, since in these three cases, with changes between "r" and "d," there are also logic value changes occurring at the output of CD. In error situations II and V, no alteration has to be carried out.

This is different in the occurrence of line errors III and IV. In these two error cases, no logic value changes take place any more at the output of comparator CD, but rather the output thereof permanently remains on a logic value "0" corresponding to the dominant condition. The output of CD thus can no longer be used for data decoding. As can be seen in the table of FIG. 4, logic value changes in both cases are still taking place at the output of one of the two comparators CA and CB, so that in error situation III, the output signal of CB and, in error situation IV, the output signal of CA can be used for proper data decoding.

In view of the foregoing, the invention takes recourse in all cases, including line error situations, to the output signal of comparator CD for data decoding when the comparator CD displays logic value changes between "1" and "0" during changes between "r" and "d". With line errors in which this does not hold, recourse is taken to the output signal of one of the two other comparators CA and CB for data decoding that still delivers logic value changes between "1" and "0" during changes between "r" and "d". This means that in error-free situation I and in the presence of line errors II and V, data decoding takes place on the basis of the output signal of comparator CD; and in case of line error III with evaluation of the output signal of comparator CB; and in case of line error IV with evaluation of the output signal of comparator CA.

In error situation VI, no possible data decoding takes place. Data decoding in the case of error situation VI indeed can be rendered possible, but with measures with which the present invention is not concerned.

Logic value patterns at the outputs of comparators CA, CB and CD, as shown in the table of FIG. 4 in connection with line errors II to V, also occur with error-free lines when no change between "r" and "d" occurs over several successive data bits, since data bits having the same binary value follow each other. Such logic value patterns at the outputs of CA, CB and CD, however, are to be rated as indicating a line error only when the condition that there is no logic value change taking place at the output of one or two of the three comparators takes longer than is permissible according to the protocol of the particular data transmission system. When looking at a CAN system used in the field of motor vehicles, for example, in which there must be no more then 11 successive equal data bits within one pulse sequence or data frame, a line error should be assumed only when, at the output of at least one of the three comparators CA, CB and CD, a potential change has no longer taken place for a period of time corresponding to the duration of more than 11 data bits. The length of this duration is dependent on the bit rate at which the data transmission takes place, which leads to a specific duration per data bit. With a bit rate of 10 kHz, for example, 11 data bits take a period of time of 1.1 ms, and with a bit rate of 100 kHz they take 110 $\mu$s. With a CAN protocol and these two bit rates and with logic value patterns at the outputs of CA, CB and CD corresponding to situations II to V, a line error thus may be assumed only when at the output of at least one comparator a logic value change has no longer taken place for a longer period of time than 1.1 ms and 110 $\mu$s, respectively.

In FIG. 1, outputs ACA, ACD and ACB of comparators CA, CD and CB, respectively, are connected to inputs of an error processing circuit FVS, the output of which constitutes a data output Rx of the receiving location in consideration.

Figure 2:
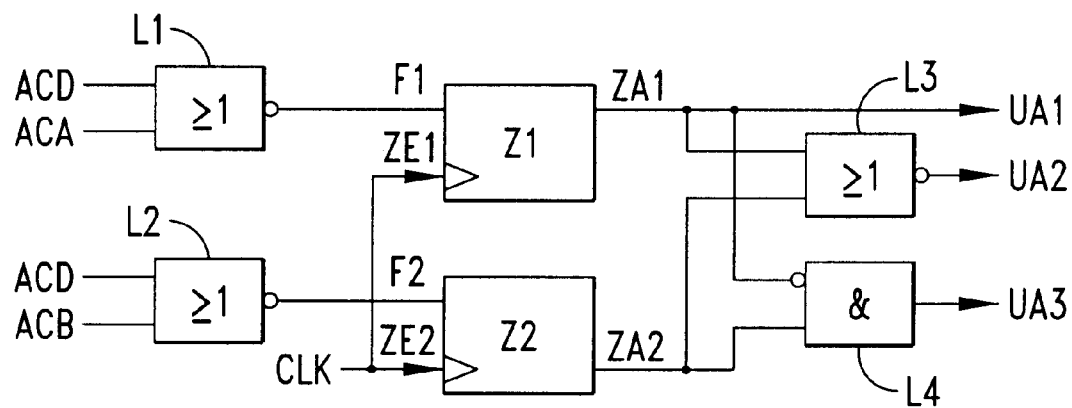
FIG. 2 shows an embodiment of an error processing circuit in accordance with the invention.
Figure 3:
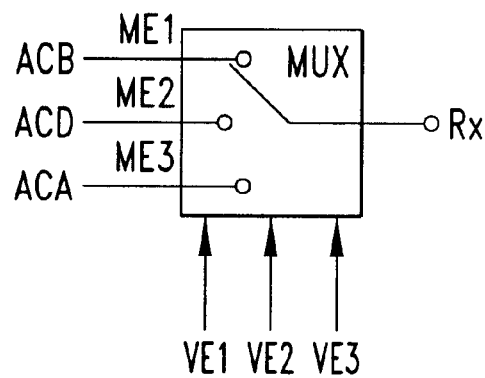
FIG. 3 shows a schematic representation of a changeover switch controlled by the error processing circuit of the invention.

The error processing circuit FVS includes a line condition detector circuit, which may have the structure shown in FIG. 2, and a changeover switch in the form of a multiplexer MUX, which is controlled by the line condition detector circuit, as shown schematically in FIG. 3, and has an output constituting the data output Rx of the receiving location in consideration.

The embodiment of a line condition detector circuit as shown in FIG. 2 in the form of a block circuit diagram comprises on the input side a first logic circuit L1 in the form of a first NOR element and a second logic circuit L2 in the form of a second NOR element. Both NOR elements each have two input terminals and an output terminal. A first input terminal of each of these two NOR elements is connected to the output ACD of comparator CD, whereas the second input of the first NOR element is connected to the output ACA of comparator CA, and the second output of the second NOR element is connected to the output ACB of comparator CB. The line condition detector circuit comprises, furthermore, two counters Z1 and Z2 each serving as time measuring means and each having a counting clock input ZE1 and ZE2, respectively, a counting release/resetting input F1 and F2, respectively, and a counter output ZA1 and ZA2, respectively. In a practical embodiment of the line condition detector circuit, the two counters are each released by a logic value "1" at the counting release/resetting input in order to count the counting clock pulses, and are reset by a logic value "0" at the counting release/resetting input F1 and F2, respectively, to an initial state, preferably a count of "0".

When one of the two counters Z1, Z2 has reached a predetermined count, it issues a logic value "1" at its counter output ZA1 or ZA2, respectively, whereas it issues a logic value "0" in the reset state and before this count is reached. The frequency of the clock pulses CLK fed to the two counting clock inputs ZE1 and ZE2 from a clock pulse source (not shown) is selected such that a logic value "1" appears at the respective counter output ZA1 and ZA2, respectively, only when a period of time has passed as of occurrence of logic value "1" at counting release/resetting input F1 and F2, respectively, that is longer than the duration of 11 data bits. In this manner, the occurrence of a logic value "1" at the counting release/resetting input F1 and F2, respectively, with respect to the through-effect thereof on the corresponding counter output ZA1 and ZA2, respectively, is masked in time or suppressed for a duration corresponding to the duration of 11 data bits. A logic value condition "1" at the counting release/resetting input F1 and F2, respectively, thus becomes effective on counter output ZA1 and ZA2, respectively, only when it lasts longer than permitted by the CAN protocol.

The output signals at counter outputs ZA1 and ZA2 are linked by means of a third logic circuit comprising a third NOR element L3 and an AND element L4, the AND element having an inverting and a non-inverting input. A first and a second input of the third NOR element L3 are connected to counter output ZA1 and counter output ZA2, respectively. The inverting input of the AND element is connected to counter output ZA1, and its non-inverting input is connected to counter output ZA2.

Counter output ZA1 constitutes a first changeover control signal output UA1. The output of third NOR element L3 constitutes a second changeover control signal output UA2, and the output of AND element L4 constitutes a third changeover control signal output UA3 of the line condition detector circuit.

The multiplexer shown in FIG. 3 comprises three multiplexer inputs ME1, ME2 and ME3 connected to the outputs ACB, ACD and ACA, respectively, of the three comparators CB, CD and CA, respectively. In addition thereto multiplexer MUX has three changeover control inputs UE1, UE2, and UE3 connected to the changeover control signal outputs UA1, UA2 and UA3, respectively, of the line condition detector circuit.

The line condition detector circuit is designed such that, in any line condition, only one of the three changeover control signal outputs UA1 to UA3 has a logic value "1" whereas the other two changeover control signal inputs exhibit logic value "0". As a consequence thereof, the data output Rx of the receiving location in consideration, in every line condition, is connected in defined manner to a specific one of the outputs ACA, ACD and ACA of the three comparators CB, CD and CA, respectively.

In error-free line condition I, counter outputs ZA1 and ZA2, also after counting release of both counters Z1 and Z2, remain on a logic value "0" on the output side, which leads to a logic value "1" at changeover control signal output UA2. In the case of line conditions II and V, a logic value "1" also appears at the second changeover control signal output UA2. In error-free line condition I and in error situations II and V, the data output Rx is thus connected to output ACD of first comparator CD, and data decoding is thus based on the output signal of comparator CD comparing the potential values of the two lines A and B. In case of line error III, a logic value "1" appears at the first changeover control signal output UA1, so that the data output Rx of multiplexer MUX is connected to output ACB of comparator CB and data decoding takes place on the basis of the output signal of comparator CB monitoring the potential changes of line B. In the case of line error IV, logic value "1" appears at the third changeover control signal output UA3, so that the data output Rx of multiplexer MUX is connected to output ACA of comparator CA and data decoding takes place on the basis of the output signal of comparator CA monitoring line A for potential changes.

Consequently, in all line conditions I to V, line condition and error processing, respectively, is carried out, which controls the connecting through of the data output RX to the output of such a comparator whose output signal, with regard to the line condition present, renders possible safe decoding of the data bits received.

Thus, in the case of line errors II to V, the error processing circuit of the invention II to V, decodes data based on the output signal of a comparator that does not permit data decoding when the line monitored by this comparator displays no potential changes due to a line error.

While a representative embodiment of the invention has been illustrated and described herein, it is to be understood that various changes may be made therein without departing from the spirit and scope of the invention. Hence, the invention is to be limited only by the scope of the claims that follow.

What is claimed is:

1. An error processing circuit for a receiving location of a system for transferring binary data in the form of pulse sequences, the system including a number of receiving locations connected via a double-line bus having a first line and a second line, a first logic value of the binary data represented by a high potential value on the first line and a low potential value on the second line, and a second logic value of the binary data represented by a low potential value on the first line and a high potential value on the second line;

each pulse sequence having no more than a predetermined number of equal data bits in succession; the circuit comprising:

a data output;

a decoder having three decoder outputs, of which a first decoder output is associated with the first and second lines the decoder configured to deliver a first decoder output signal dependent on the difference between the potential values of both lines, and a second decoder output associated with the first line and configured to deliver a second decoder output signal dependent on the difference between the potential value of the first line and a first mean potential value, and a third decoder output associated with the second line to deliver a third decoder output signal dependent on the difference between the potential value of the second line and a second mean potential value, the first mean potential value and the second mean potential value each lying between the high potential value and the low potential value, and in an error-free case and upon occurrence of line errors of a first error group with a line error on one of the two lines, at least the first decoder output delivers properly decoded data, and upon occurrence of a second error group with a line error on one of the two lines, only the decoder output associated with the error-free other line still delivers properly decoded data;

a line condition detector circuit, by means of which error-free line conditions as well as line errors of the first line and line errors of the second line can be detected depending on the decoder output signals, and changeover control signals can be delivered depending on the particular detection result; and a controllable changeover switch by means of which the data output, upon detection of line conditions in which only the second or third decoder output delivers properly decoded data, is connected to this decoder output and otherwise to the first decoder output.

2. The error processing circuit of claim 1,
wherein the line condition detector circuit comprises:
a first logic circuit linking the first decoder output signal and the second decoder output signal and delivering a first logic signal;
a second logic circuit linking the first decoder output signal and the third decoder output signal and delivering a second logic signal;
a first time measuring circuit measuring the first logic signal and a second time measuring circuit measuring the second logic signal, by means of which a time measurement of logic signal values of the first and second logic signals, respectively, which may mean a line error, is carried out and a first and second line error signal, respectively, is generated when such a logic signal value, as of occurrence thereof, has a longer duration than a duration corresponding to the predetermined number of equal data bits; and
a third logic circuit linking the two line error signals, said third logic circuit configured to link the two line error signals and to provide the changeover control signal.

3. The error processing circuit of claim 2 wherein the first and second logic circuits each comprise a NOR element having a first input, a second input, and an output, the first input connected to the first decoder output, and the second input thereof being connected to the second and third decoder outputs, respectively.

4. The error processing circuit of claim 3,
wherein the first and second time measuring circuits each comprise a counter having a counting release/resetting input, a counting clock input, and a counter output, and the counting release/resetting inputs being connected to the output of the first and second logic circuits, respectively, the clock signal inputs thereof being each connected to a counting clock pulse source, and the counter outputs being connected to a first and second input, respectively, of the third logic circuit.

5. The error processing circuit of claim 4, wherein the third logic circuit comprises a third NOR element having a first input, a second input, and an output, and with an AND element having an inverting input, an non-inverting input, and an output, the first input of the third NOR element and the inverting input of the AND element are connected to the counter output of the first counter, and the second input of the third NOR element and the non-inverting input of the AND element are connected to the counter output of the second counter, the counter output of the first counter, the output of the third NOR element and the output of the AND element constitute a first, a second, and a third changeover control signal output, respectively, at which first, second and third changeover control signals, respectively, are available.

6. The error processing circuit of claim 5,
wherein the controllable changeover switch comprises a multiplexer having a first multiplexer input connected to the first decoder output, a second multiplexer input connected to the second decoder output, and a third multiplexer input connected to the third decoder output, a multiplexer output connected to the data output, and a first changeover control input connected to the first changeover control signal output, a second changeover control input connected to the second changeover control signal output, and a third changeover control input connected to the third changeover control output, with the data output, depending on whether a potential value to be rated as changeover control signal occurs at the first, second or third changeover control input, establishing a connection to the third, first and second comparator output, respectively.

7. The error processing circuit of claim 1, wherein the decoder comprises a first comparator, a second comparator and a third comparator, each having a first comparator input, a second comparator input, and a comparator output, the first and second inputs of the first comparator being connected to the first and second lines, respectively, the first comparator input of the second comparator being connected to the first line, the second comparator input of the third comparator being connected to the second line, and the second comparator input of the second comparator and the first comparator input of the third comparator being each connected to a reference voltage source delivering the respectively associated mean potential value, and the comparator output of the first comparator constituting the first decoder output, the comparator output of the second comparator constituting the second decoder output, and the comparator output of the third comparator constituting the third decoder output.

8. An error detection circuit for a double-line bus having a first line and a second line, the circuit comprising:
a decoder coupled to the first and second lines and configured to detect the condition of first and second signals on the first and second lines, respectively, and to output a decoder output signal corresponding to the condition; and
a line condition detector circuit coupled to the decoder and configured to receive the decoder output signal, the line condition detector circuit including logic circuits to determine which of the first and second lines is error-free and a switch circuit to couple the error-free line to an output.

9. The circuit of claim 8 wherein the decoder comprises a first comparator having a first input coupled to the first line, a second input to a first mean value voltage source, and a first decoder signal output; a second comparator having a first input coupled to the first line, a second input coupled to the second line, and a second decoder signal output; and a third comparator having a first input coupled to the second line, a second input coupled to a second mean value voltage source, and a third decoder signal output, the first and second mean value voltage sources having a value between the lowest potential value and the highest potential value of the first and second signals.

10. The circuit of claim 9 wherein the line condition detector circuit comprises a first logic circuit having a first input coupled to the first decoder signal output, a second input coupled to the second decoder signal output, and a first logic signal output; a second logic circuit having a first input coupled to the third decoder signal output, a second input coupled to the second decoder signal output, and a second logic signal output; a first timer circuit having a first input coupled to the first logic signal output, a second input coupled to a clock signal, and a first timer output; and a second timer circuit having a first input coupled to the second logic signal output, a second input coupled to the clock signal, and a second timer output.

11. The circuit of claim 10 wherein the first and second logic circuits comprise NOR elements.

12. The circuit of claim 10 wherein the line condition detector circuit further comprises a third logic circuit having a first input coupled to the first timer output, a second input coupled to the second timer output, and a third logic signal output; a fourth logic circuit having a first input coupled to the first timer output, a second input coupled to the second timer output, and a fourth logic signal output.

13. The circuit of claim 12 wherein the switch circuit comprises a multiplexer having a first input coupled to the first decoder signal output, a second input coupled to the second decoder signal output, a third input coupled to the third decoder signal output, a fourth input coupled to the first timer output, a fifth input coupled to the third logic signal output, and a sixth input coupled to the fourth logic signal output, and a multiplexer output coupled to the output of the switch circuit, the multiplexer being configured to select one of the first, second, and third decoder signal outputs in response to the first timer output, the third logic signal output, and the fourth logic signal output that is rendering a decoding signal.

14. The circuit of claim 13 wherein the third logic circuit comprises an AND gate and the fourth logic circuit comprises a NOR gate.

15. A method of error detection on a data transmission system having a dual-line bus, the bus having a first line and a second line for conducting first and second signals, respectively, the method comprising:

comparing the first signal on the first line to a first reference voltage and generating a first decoder signal;

comparing the first signal and the second signal and generating a second decoder signal;

comparing the second signal on the second line to a second reference voltage and generating a third decoder signal;

detecting line faults on the first and second lines from the first, second, and third decoder signals; and selecting one of the first and second lines that does not have a line fault.

16. The method of claim 15 wherein detecting line faults comprises monitoring the first line and the second line for successive bit sequences in the first signal and in the second signal that exceed an associated predetermined period of time.

17. The method of claim 16 wherein monitoring the first and second lines comprises monitoring for stuck-at-one and stuck-at-zero faults.

18. The method of claim 16 wherein monitoring comprises NOR'g the first and second decoder signals and generating a first logic signal;

NOR'g the second and third decoder signals and generating a second logic signal;

timing the first logic signal and generating a first timing signal; and timing the second logic signal and generating a second timing signal.

19. The method of claim 18 wherein monitoring further comprises AND'g the first and second timing signals to generate a third logic signal, and NOR'g the first and second timing signals to generate a fourth logic signal.

20. The method of claim 19 wherein selecting one of the first lines comprises multiplexing the first decoding signal, the second decoding signal, the third decoding signal, the first timing signal, the third logic signal, and the fourth logic signal.

* * * * *